March 10, 1942. H. M. WOELFEL 2,275,812
PREFORMED MULTIPANE GLAZING UNIT
Original Filed May 13, 1938 2 Sheets-Sheet 1

INVENTOR
H.M.WOELFEL
BY Fetherstonhaugh &Co.
ATTORNEYS

March 10, 1942.  H. M. WOELFEL  2,275,812
PREFORMED MULTIPANE GLAZING UNIT
Original Filed May 13, 1938   2 Sheets-Sheet 2

INVENTOR
H. M. WOELFEL
BY Fetherstonhaugh & Co.
ATTORNEYS

Patented Mar. 10, 1942

2,275,812

UNITED STATES PATENT OFFICE 2,275,812

PREFORMED MULTIPANE GLAZING UNIT

Harold M. Woelfel, Montreal, Quebec, Canada, assignor to The Robert Mitchell Co. Limited, Montreal, Quebec, Canada Original application May 13, 1938, Serial No. 207,719. Divided and this application March 11, 1940, Serial No. 323,346

3 Claims. (Cl. 154—28)

This invention relates to improvements in preformed multi-pane glazing units for insulating windows and to the provision of a simple and efficient method of manufacture whereby such units may be rapidly and economically produced on a commercial scale with a minimum amount of manual labor.

The present application is a division of my co-pending application Serial No. 207,719, filed on May 13, 1938.

As described herein my improved glazing unit comprises two spaced panes of glass cemented together by a continuous marginal sealing strip of plastic material interposed between their marginal edges. Spacers, preferably in the form of resilient rubber blocks, are embedded in the sealing strip to prevent collapse of the unit by external pressure. The best results from both a service and a manufacturing standpoint are obtained by using a resilient plastic composition which is capable of being extruded into place between the panes and has the property of retaining a soft, resilient, non-flowing plastic condition under all climatic conditions to which the glazing unit is likely to be exposed. The use of a sealing composition which remains soft and resilient at low temperatures eliminates the hazard of seal failure due to chipping or cracking of the composition itself. These properties of the sealing composition also serve, in conjunction with the resiliency of the embedded rubber spacers, to lessen danger of rupture of the seal by stresses due to the expansion, contraction and flexure of the glass panes which takes place under varying atmospheric conditions.

My improved glazing unit is preferably produced with the aid of the apparatus disclosed in my said co-pending application Serial No. 207,719. Such apparatus includes a stationary extrusion nozzle in combination with a travelling carrier on which the two panes of glass are mounted in upright position and in the desired spaced relation. The plastic sealing composition is extruded through the downwardly directed nozzle in a suitable stream which enters and fills the space between the uppermost edges of the panes as the latter are moved past the nozzle by the carrier. The carrier is power driven at a speed equal to the rate of extrusion to ensure the laying of a uniform strip of the sealing composition between and in adhesive contact with the inner surfaces of the opposed panes.

During the sealing operation the position of the panes on the carrier is changed so that the different corresponding edges to be united by the sealing material are successively presented to the extrusion nozzle. As set forth in my co-pending application this is facilitated by providing the carrier with supports in which the lowermost edges of the panes are removably mounted. After the initial sealing strip is laid between the then uppermost edges of the panes the latter are removed and turned so that they may be replaced in the supports with different corresponding edges presented to the nozzle. This removal and turning of the panes is repeated until all the corresponding edges are cemented together by the successively laid sealing strips merged at their ends to form a continuous marginal seal for the cell space reserved between the panes.

As previously stated, suitable spacers, in the form of resilient blocks of rubber, are embedded in the plastic sealing material to prevent collapse of the unit by external pressure. These spacers are placed against the exposed surfaces of the previously applied sealing strips and then pressed inwardly to a position inwardly of the adjacent marginal edges of the panes. The plasticity and resiliency of the sealing composition is such that the portions of the sealing strips into which the spacers are pressed are bulged inwardly without being ruptured by the spacers. After the spacers have been forced into place additional sealing material is applied by the operator to cover their exposed surfaces.

In some cases, especially when the glazing unit is of relatively large size, the marginal edges of the unit are provided with U-shaped metal binding strips which are fitted over the edges of the panes and cemented in place to hold the panes against accidental displacement. In other instances the marginal portions of the glazing unit may be provided with protective strips of metal foil such, for example, as the protective strips described and claimed in the co-pending application of Solomon G. Lipsett, filed Aug. 29, 1938, under Serial No. 227,405, now U. S. Letters Patent No. 2,233,952, dated March 4, 1941.

The units provided in accordance with this invention may be of the hermetically sealed type or may be vented as disclosed in the aforesaid co-pending application Serial No. 227,405.

In the further description of this invention reference will be had to the accompanying drawings, wherein—

Figs. 3 to 9 inclusive are diagrammatic views illustrating various manufacturing steps involved in producing my improved glazing unit with the aid of apparatus more fully disclosed in my co-pending application Serial No. 207,719.

Figure 1:
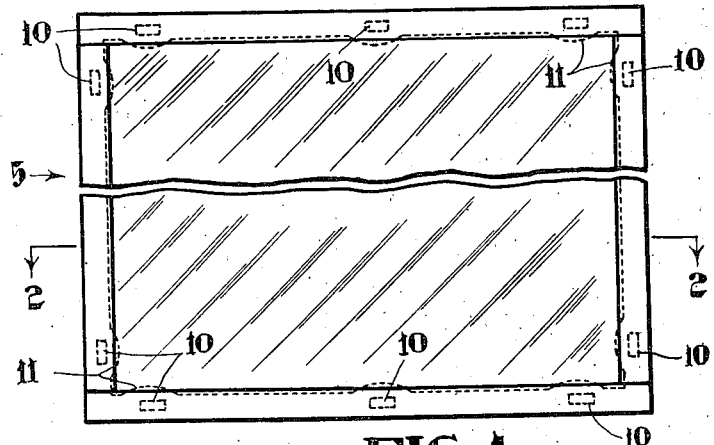
Fig. 1 is a view, in front elevation, of the complete glazing unit provided in accordance with this invention.
Figure 2:
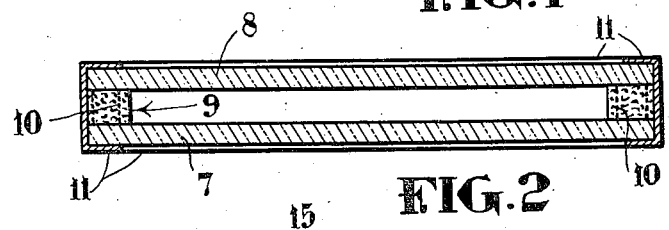
Fig. 2 is a sectional view taken along the line 2—2 of Fig. 1.
Figure 5:
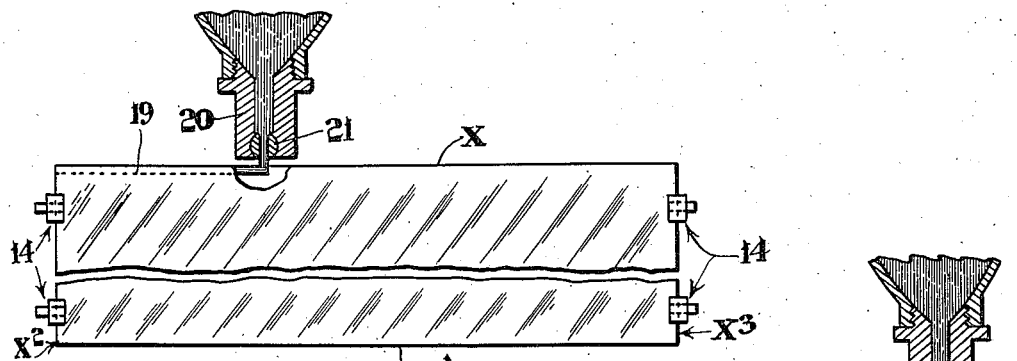

Referring to Figs. 1 and 2, 5 designates a preformed multi-pane glazing unit adapted to be mounted in any suitable type of sash frame. This unit comprises transparent panes 7 and 8 spaced apart by sealing means 9 interposed between their marginal edges. The sealing means is shown as a continuous marginal strip of plastic composition in which suitable spacers 10 are embedded to prevent collapse of the unit by external pressure. The composition 9 is one that does not harden to brittleness but retains a relatively soft, tacky, and non-flowing condition and possesses considerable resiliency. The use of a sealing composition having these properties is an important factor in preventing rupture of the seal by the stresses due to expansion, contraction and flexure of the panes 7 and 8 under varying atmospheric conditions.

I have found that a plastic composition suitable for joining the edges of the panes 7 and 8 may be obtained by adding suitable plasticizing agents to certain synthetic resins manufactured by Shawinigan Chemicals Limited, of Shawinigan Falls, Quebec, Canada. The resins in question are sold under the trade name "Formvar 7–90" and "Formvar 15–95." In one instance the synthetic resin sold under the trade name "Formvar 7–90" was plasticized by the addition of 50% of diacetin and gave an adhesive plastic characterized by a melting point of not over 180° C. and by the property of remaining flexible at temperatures as low as −20° F. A product having similar properties was obtained when the synthetic resin sold under the trade name "Formvar 15–95" was plasticized by the addition of 50% of dibutyl phthalate.

Panes 7 and 8 may also be joined together in a satisfactory manner by use of compositions of the class disclosed in U. S. Patents 2,070,331, dated Feb. 9, 1937, and Reissue 20,430, dated June 29, 1937.

The composition 9 should be one capable of being extruded into place between the marginal edges of the panes 7 and 8. The spacers 10 are composed of resilient blocks of rubber which are pressed into and completely covered by the composition 9 after the latter has been laid in place as hereinafter described.

If the glazing unit 5 is to be of the hermetically sealed type a hypodermic needle is forced through the sealing composition 9 to provide an outlet through which air may be pumped from the cell space between the panes 7 and 8. When the needle is withdrawn the plastic material displaced thereby resumes its former position and closes the needle opening. The panes 7 and 8 are then clamped together at their edges by U-shaped metal binding strips 11 applied as shown in Figs. 1 and 2.

If the glazing unit is to be of the vented type it is equipped with suitable venting means such, for example, as the venting means disclosed in the aforesaid co-pending application Serial No. 227,405. The metal foil protecting strip shown said co-pending application may also be used in place of the binding 11 to prevent impairment of the sealing composition 9 by the oils and solvents contained in the caulking compounds employed for mounting the glazing unit in a sash or window frame.

The method of producing the glazing unit disclosed in Figs. 1 and 2 will now be described with reference to Figs. 3 to 9 inclusive, it being understood that said method is carried out with the aid of the apparatus described in my co-pending application Serial No. 207,719.

Figure 4:
Figure 3:
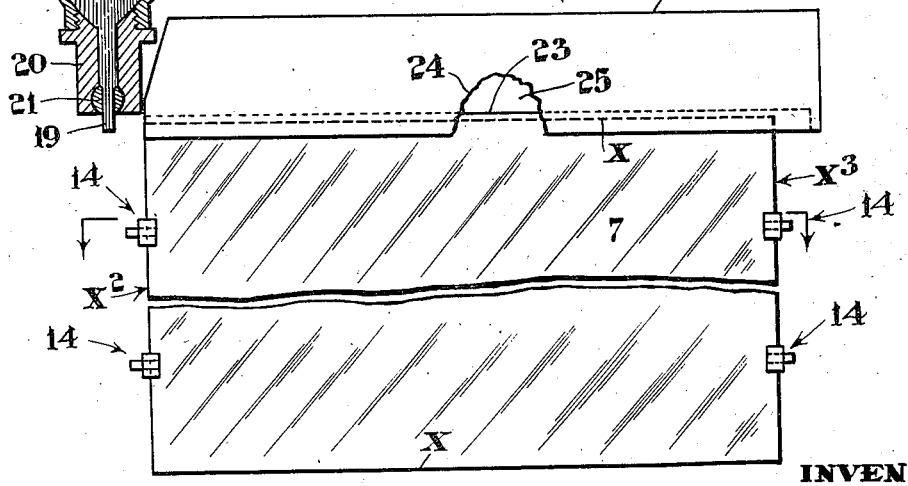
Figure 6:
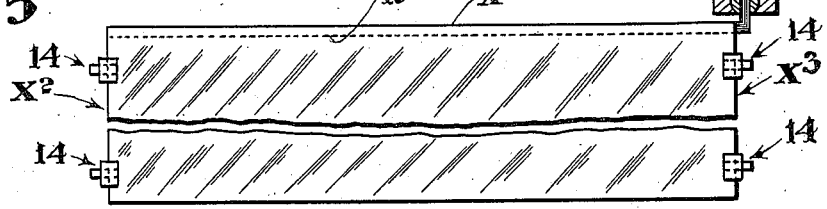
Figure 7:
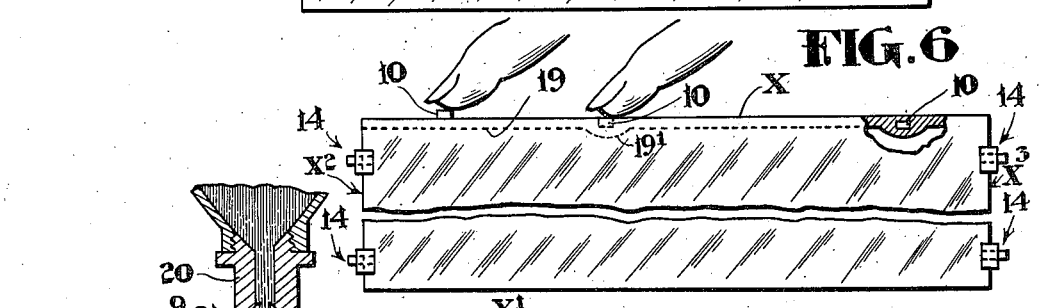
Figure 8:
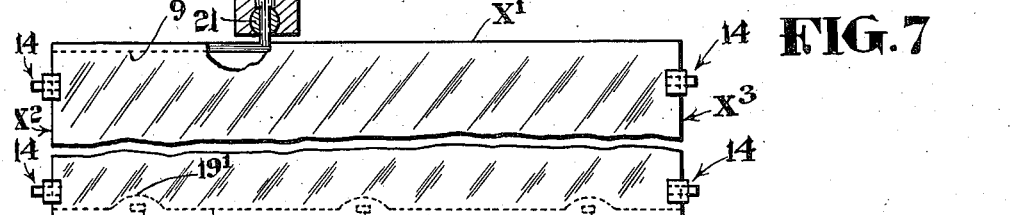
Figure 9:
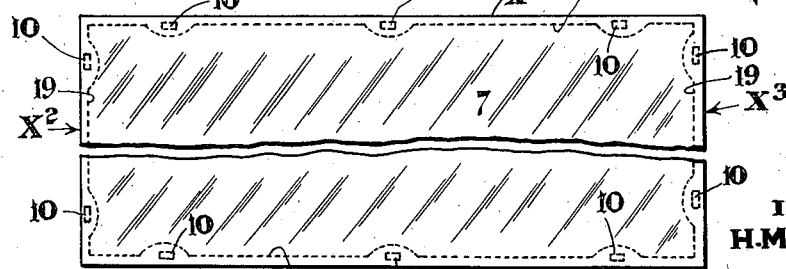

The transparent panes 7 and 8 are first fastened together in the desired spaced relationship by removable fittings 14 applied to those edges of the panes which are disposed vertically during the initial operation of laying the sealing strip in place between the uppermost edges of the panes. As shown more particularly in Fig. 4, each fitting 14 comprises a U-shaped clip 15 and a U-shaped spacer spring 16. Each clip is fitted over corresponding edges of the panes as shown in Fig. 4 and is provided with an opening 17 through which the free ends of the cooperating spring 16 is passed into spreading engagement with the inner surfaces of the two panes. As each spring is released its side arms separate and press the panes against the side arms of the cooperating clip. The resulting assembly is then mounted on a suitable carrier of the type described in my co-pending application so that the uppermost edges X of the panes, as viewed in Figs. 3 and 5, may be moved to the left past a satisfactory extrusion nozzle 20 through which a strip of the sealing composition 19 is forced between the uppermost edges of the glass panes as they travel past the delivery end of the nozzle. When the uppermost edges of the glass panes 7 and 8 have been sealed together along their entire length as indicated in Fig. 6, the nozzle valve 21 is closed and the carrier returned to its original starting position. Rubber spacing blocks 10 are then pressed into place between the sealed edges of the panes as shown in Fig. 7. During the placement of these spacing blocks portions of the sealing strip 19 into which they are pressed are bulged inwardly as indicated at 19'. These inwardly bulged portions 19' ensure a tight sealing between the panes at the points where the spacers are applied. After the spacers are pressed into place their outer surfaces are covered by the sealing compound as shown at the right of Fig. 7. The partly sealed panes 7 and 8 are now removed from the carrier (not shown) and then replaced thereon with the edges X and X' transposed as shown in Fig. 8. When the edges X' have been sealed together and fitted with the rubber spacers 10, as indicated in Figs. 8 and 9, the temporary fittings 14 are no longer required and are removed. The edges $X^2$ and $X^3$ from which these fittings are removed are then successively sealed together and fitted with permanent spacers in the same manner as described in connection with the previously mentioned edges.

I have found that the bonding of the sealing strips 19 with the panes 7 and 8 is improved when the uppermost edges of the panes are heated prior to being passed beneath the extrusion nozzle 20. This heating of the panes may be accomplished in any desired manner, for example, by providing spaced electric heating elements 23 (Fig. 4) at the right of the nozzle 20 so that the uppermost edges of the panes pass between and are heated by these heating elements as the said edges are moved into position beneath the nozzle. The heating elements 23 may be fastened to opposite side walls 24 and 25 by a hood 26 which fits over the upper edges of the panes 7 and 8 when the latter are positioned to the right of nozzle 20.

Having thus described my invention, what I claim is:

1. The method of making glazing units for insulating windows comprising cementing together two spaced transparent panes by interposing a continuous marginal sealing strip of adhesive plastic composition between the marginal edges of the panes and then embedding a plurality of spaced resilient rubber blocks in said plastic composition by placing each block against the exposed surface of the composition and pressing the block inwardly to a position between the opposing surfaces of the panes.

2. The method as set forth in claim 1 including the additional step of applying a covering layer of the sealing composition to the outer exposed surface of each block after the latter has been pressed into place between the opposing surfaces of the panes.

3. The method of making a glazing unit which comprises arranging two transparent panes in spaced opposing relation with corresponding edges of the panes lying in a common plane, successively cementing together the different corresponding edge portions of the panes by interposing a sealing strip of adhesive plastic composition between said portions, pressing resilient spacer blocks into the plastic composition at suitable intervals along each side of the unit so that the blocks are embedded in the composition with their lower surfaces lying inwardly of the adjacent edges of the panes, then applying a covering layer of the sealing composition to the said outer surface of each block.

HAROLD M. WOELFEL.